(12) United States Patent
Cao et al.

(10) Patent No.: US 9,317,319 B2
(45) Date of Patent: *Apr. 19, 2016

(54) MONITORING AND DYNAMICALLY RECONFIGURING VIRTUAL MACHINE PATTERNS

(71) Applicant: International Business Machines Corporation, Armonk, NY (US)

(72) Inventors: Bin Cao, Rochester, MN (US); Daniel L. Hiebert, Pine Island, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/488,131

(22) Filed: Sep. 16, 2014

(65) Prior Publication Data

US 2016/0034293 A1 Feb. 4, 2016

Related U.S. Application Data

(63) Continuation of application No. 14/450,830, filed on Aug. 4, 2014.

(51) Int. Cl.
*G06F 9/46* (2006.01)
*G06F 9/455* (2006.01)

(52) U.S. Cl.
CPC .. *G06F 9/45558* (2013.01); *G06F 2009/45591* (2013.01); *G06F 2009/45595* (2013.01)

(58) Field of Classification Search
CPC .................................................. G06F 9/45558
USPC ...................................................... 718/1–108
See application file for complete search history.

(56) References Cited

U.S. PATENT DOCUMENTS

| | | | |
|---|---|---|---|
| 8,533,710 B1 | 9/2013 | Long et al. | |
| 8,566,812 B1 * | 10/2013 | Printezis | G06F 9/45558 717/158 |
| 8,606,897 B2 | 12/2013 | Ferris et al. | |
| 8,775,544 B2 * | 7/2014 | Umbehocker | G06F 3/0604 709/212 |
| 2009/0276771 A1 | 11/2009 | Nickolov et al. | |
| 2011/0265082 A1 * | 10/2011 | Ashok | G06F 8/63 718/1 |
| 2011/0289206 A1 * | 11/2011 | Vecera | H04L 43/16 709/224 |
| 2012/0131194 A1 * | 5/2012 | Morgan | G06F 9/5072 709/226 |
| 2013/0007761 A1 * | 1/2013 | O'Sullivan | G06Q 10/00 718/104 |
| 2013/0238805 A1 | 9/2013 | Catrein et al. | |

(Continued)

OTHER PUBLICATIONS

Siegel, Howard Jay, et al. "PASM: A partitionable SIMD/MIMD system for image processing and pattern recognition." Computers, IEEE Transactions on 100.12 (1981): pp. 934-947.*

(Continued)

*Primary Examiner* — Satish Rampuria
(74) *Attorney, Agent, or Firm* — Martin & Associates, LLC; Derek P. Martin (57) ABSTRACT

A cloud manager monitors running VM patterns, determines potential VM patterns that have a different configuration than the running VM patterns, and performs estimates of a plurality of metrics for the potential VM patterns. When the estimates for the potential VM patterns exceed the monitored VM patterns currently running by some threshold amount, the potential VM patterns may be automatically deployed to one or more clouds. The result is a cloud-based system that is automatically and dynamically tuned to changing conditions.

12 Claims, 7 Drawing Sheets

(56) References Cited

U.S. PATENT DOCUMENTS

2014/0068075 A1    3/2014  Bonilla et al.
2014/0189686 A1*   7/2014  Masters .............. G06F 9/45533
                                                            718/1

OTHER PUBLICATIONS

Liao, Xiaofei, Hai Jin, and Haikun Liu. "Towards a green cluster through dynamic remapping of virtual machines." Future Generation Computer Systems 28.2 (2012): pp. 469-477.*

Corsaro, Angelo, et al. "Virtual component: a design pattern for memory-constrained embedded applications." Proceedings of the 9th Annual Conference on the Pattern Languages of Programs. 2002, pp. 1-13.*

Dyer et al., "Nu: a dynamic aspect-oriented intermediate language model and virtual machine for flexible runtime adaptation", Proceedings of the 7th international conference on Aspect-oriented software development, p. 191-202, Mar. 2008.

Bobroff et al., "Dynamic placement of virtual machines for managing sla violations", 10th IFIP/IEEE International Symposium on Integrated Network Management, p. 119-128, May 2007.

Wickremasinghe et al., "Cloudanalyst: A cloudsim-based visual modeller for analysing cloud computing environments and applications", (AINA), International Conference on Advanced Information Networking and Applications, p. 446-452, Apr. 2010.

Cao et al., "Monitoring and Dynamically Reconfiguring Virtual Machine Patterns" U.S. Appl. No. 14/450,830, filed Aug. 4, 2014.

List of IBM Patents or Patent Applications Treated as Related.

* cited by examiner

MONITORING AND DYNAMICALLY RECONFIGURING VIRTUAL MACHINE PATTERNS

BACKGROUND

1. Technical Field

This disclosure generally relates to computer systems, and more specifically relates to monitoring virtual machine (VM) patterns as they run and dynamically adjusting the VM patterns according to one or more metrics.

2. Background Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments known as virtual machines. The System X computer system developed by IBM is an example of a computer system that supports logical partitioning into multiple virtual machines. If multiple virtual machines on a System X computer system are desired, partition manager code (referred to as a "hypervisor" in IBM terminology) is installed that allows defining different virtual machines on the same platform. Once the partition manager is installed, virtual machines may be created that define different computing environments. The partition manager manages the logical partitions to assure that they can share needed resources in the computer system while maintaining the separate computing environments defined by the virtual machines.

Virtual machines are used extensively in computing solutions that are cloud-based. As the demands for cloud solutions increase, open source software for building clouds, such as OpenStack, have become a building block for creating a reliable and flexible cloud platform.

Deploying a computing solution to a cloud involves many considerations and decisions, such as security (public v. private cloud), price, reliability, Quality of Service, whether a single VM or multiple VMs are needed, etc. The process for finding a suitable cloud for deploying one or more VMs is currently a manual one made by a human administrator. Thus, a human administrator determines the specifications for a desired computing solution or part of a desired computing solution, and manually looks for a cloud that satisfies the specifications. When the human administrator selects a suitable cloud, the human administrator can deploy the computing solution to the selected cloud. The human administrator may then monitor performance of the computing solution, and manually make decisions regarding if and when to change configuration of the computing solution, such as moving part of the computing solution to a different cloud.

BRIEF SUMMARY

A cloud manager monitors running VM patterns, determines potential VM patterns that have a different configuration than the running VM patterns, and performs estimates of a plurality of metrics for the potential VM patterns. When the estimates for the potential VM patterns exceed the monitored VM patterns currently running by some threshold amount, the potential VM patterns may be automatically deployed to one or more clouds. The result is a cloud-based system that is automatically and dynamically tuned to changing conditions.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a cloud manager that monitors running VM patterns, determines potential VM patterns that have a different configuration than the running VM patterns, and performs estimates of a plurality of metrics for the potential VM patterns. When the estimates for the potential VM patterns exceed the monitored VM patterns currently running by some threshold amount, the potential VM patterns may be automatically deployed to one or more clouds. The result is a cloud-based system that is automatically and dynamically tuned to changing conditions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
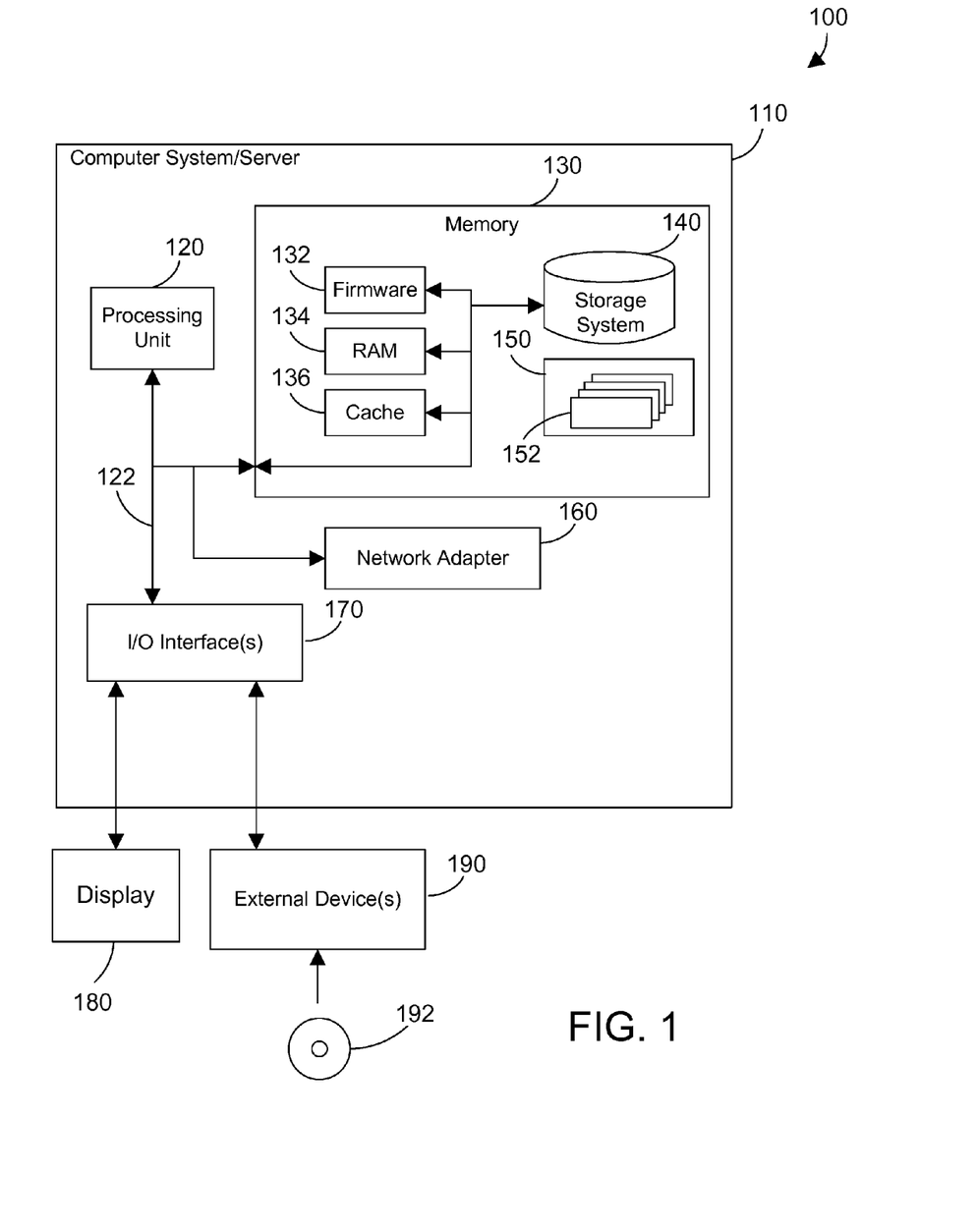
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
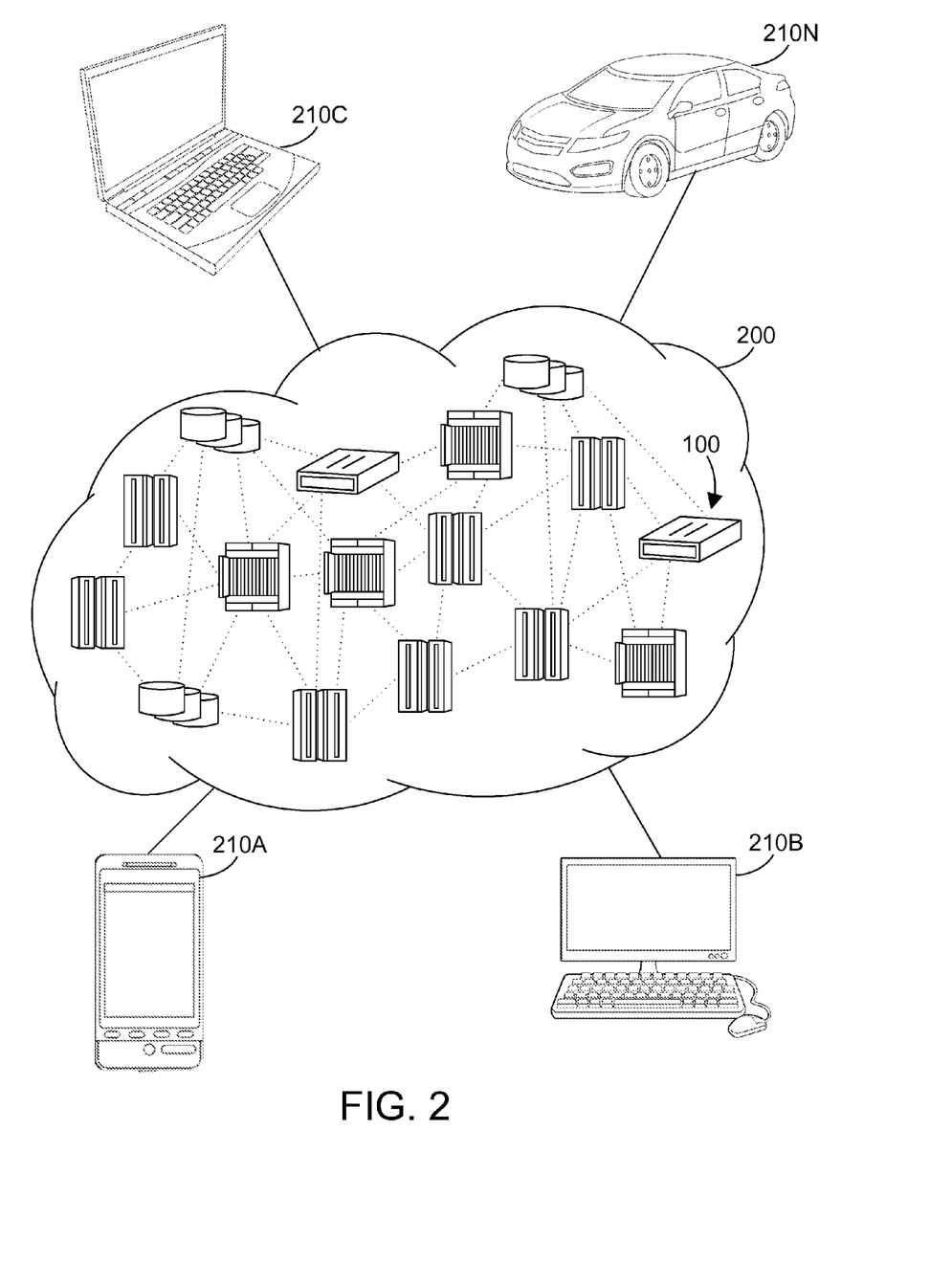
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
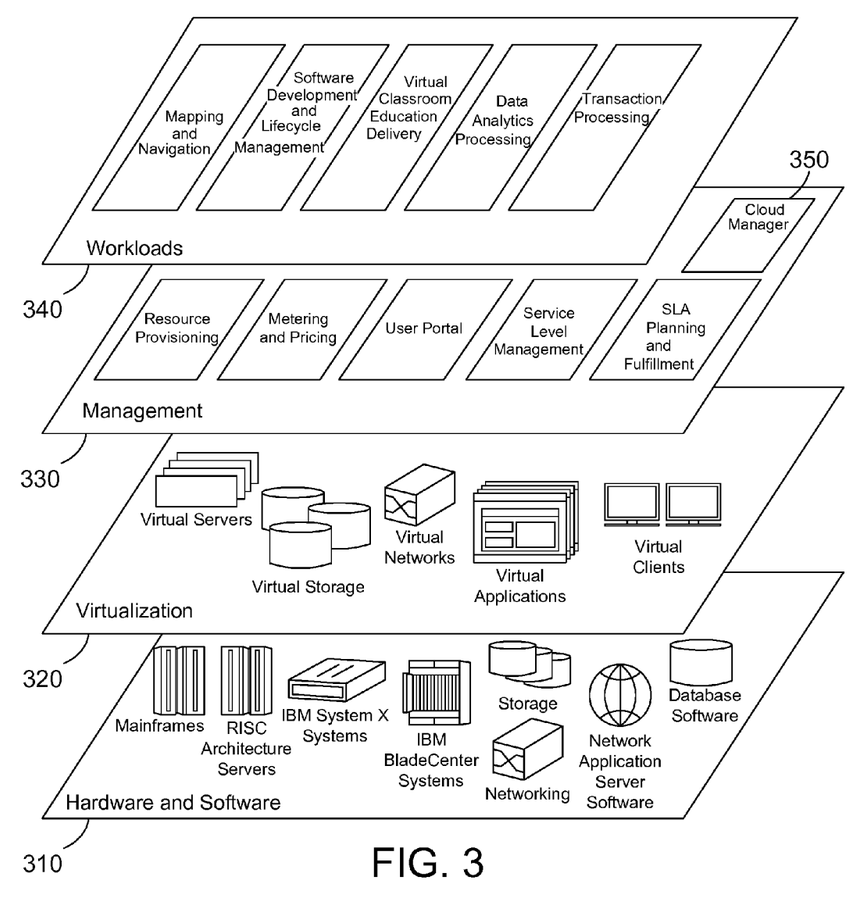
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager as described in more detail below. While the cloud manager 350 is shown in FIG. 3 to reside in the management layer 330, cloud manager 350 can span all of the levels shown in FIG. 3, as discussed in detail below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
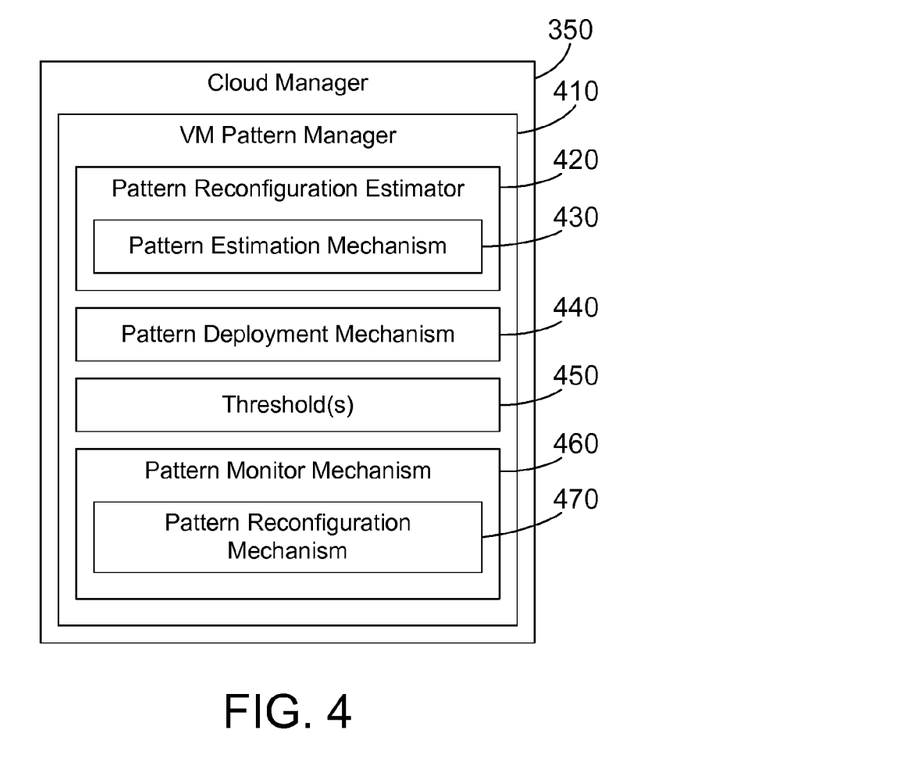
FIG. 4 is a block diagram of one suitable implementation for the could manager 350 shown in FIG. 3.

The cloud manager 350 in FIG. 4 is one specific example for the cloud manager 350 in FIG. 3. Cloud manager 350 includes a VM pattern manager 410 that manages VM patterns. As used herein, a VM pattern describes some aspect or aspects of virtual resources. In the most preferred implementation, a VM pattern is a specification or configuration for a set of virtual objects, which may include VMs, virtual networks, virtual disks, virtual applications, etc. A VM pattern can be viewed as a blueprint that standardizes the deployment of complex tiered applications. A VM sub-pattern is one specific type of VM pattern that is derived from a different VM pattern. A VM pattern allows the set of virtual objects defined by the VM pattern to be managed as a single object. For example, a VM pattern may be deployed, cloned, shutdown, paused, or deleted. Performing any function on a VM patterns results in performing that function on all of the virtual objects in the set defined by the VM pattern. The VM pattern manager 410 monitors performance of running VM patterns, determines when dynamic reconfiguration of the VM patterns and is needed, then dynamically reconfigures the VM patterns. The VM pattern manager 410 thus provides a way for the cloud manager to dynamically monitor and reconfigure VM patterns as needed.

The VM pattern manager 410 includes a pattern reconfiguration estimator 420. The pattern reconfiguration estimator 420 includes a pattern estimation mechanism 430 that is used to estimate one or more metrics for any potential reconfigurations of a VM pattern. Potential reconfigurations of a VM pattern include splitting a VM pattern, coalescing two VM patterns into one, adjusting allocation of virtual resources within one or more VM patterns, etc. The pattern estimation mechanism 430 allows the pattern reconfiguration estimator 420 to analyze many different possible reconfigurations of one or more VM patterns to determine which is the best. Once the pattern reconfiguration estimator 420 determines how to reconfigure one or more VM patterns, the reconfigured VM pattern or patterns are deployed by a pattern deployment mechanism 440, preferably to one or more clouds. After deploying the patterns, the patterns are now running. The VM pattern manager 410 defines one or more thresholds 450 that are defined in terms or one or more metrics relating to VM patterns. A threshold can be a value relating to one specific metric, or can be a composite that relates to multiple metrics. The use of thresholds 450 is discussed in more detail below. The VM pattern manager 410 also includes a pattern monitor mechanism 460 that monitors the running patterns after deployment using one or more metrics. This monitoring can involve, for example, observing log files of VMs and virtual applications (Vapps), communicating with cloud managers in multiple clouds, monitoring relationships between VMs and/or patterns, and monitoring network performance and dependencies. The pattern monitor mechanism 460 can monitor any suitable metric, as described in more detail below. The pattern monitor mechanism 460 can use the pattern reconfiguration estimator 420 to perform potential splits or other reconfigurations of the overall VM pattern or of any sub-pattern. The pattern estimation mechanism 430 can then determine whether the potential VM patterns are desirable in light of the monitored running patterns when compared to the estimated potential patterns based on the one or more thresholds 450. When the estimated metrics for the potential patterns exceed the measured metrics for the running patterns by some defined threshold 450, the pattern reconfiguration mechanism 470 can reconfigure the patterns by deploying the potential patterns. In one specific implementation, the deployment of the potential patterns includes removing the existing running patterns, and replacing them with the potential patterns. In an alternative implementation, the existing running patterns can be modified to deploy the potential patterns. In this manner the cloud manager can dynamically monitor patterns and dynamically reconfigure patterns as needed. An alternative implementation would be for the pattern reconfiguration mechanism 470 to notify a system administrator that reconfiguration of one or more VM patterns is needed. In response, the system administrator could manually reconfigure one or more VM patterns according to the received notification.

Figure 5:
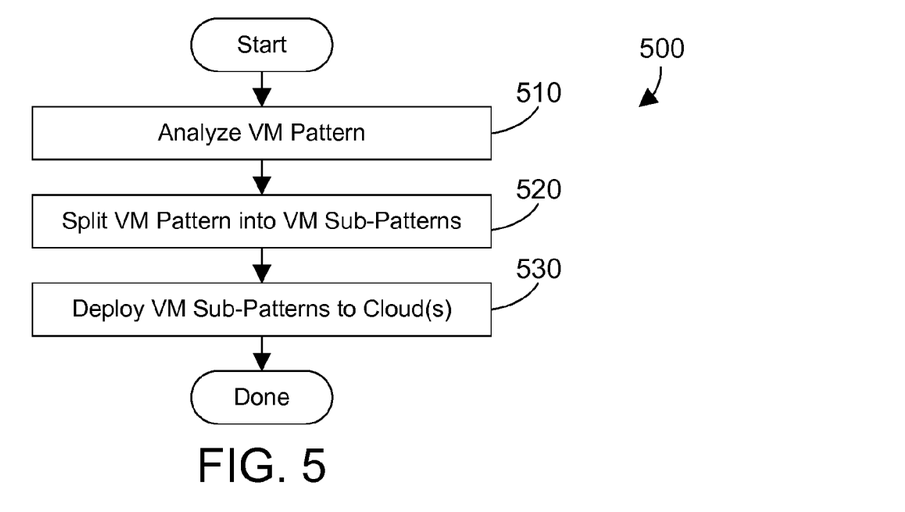
FIG. 5 is a flow diagram of a method for splitting a VM pattern into VM sub-patterns.

Referring to FIG. 5, a method 500 shows steps preferably performed by the pattern manager 410 shown in FIG. 4. A VM pattern is analyzed (step 510). Analysis of the VM pattern may include estimating one or more metrics for the VM pattern, and determining how the VM pattern could be potentially split into multiple VM sub-patterns. Different potential VM sub-patterns could be considered. A suitable split of the VM pattern into VM sub-patterns is determined (step 520). The VM sub-patterns are then deployed to one or more clouds (step 530). At this point, the VM sub-patterns are deployed and running Note that steps 510 and 520 could be performed by the pattern reconfiguration estimator 420 in FIG. 4, and step 530 could be performed by the pattern deployment mechanism 440 in FIG. 4. Of course, other implementations are also possible. Method 500 could apply to splitting any VM pattern, including a VM sub-pattern. While method 500 is shown for the specific case of splitting a pattern, splitting is only one specific type of pattern reconfiguration that could be accomplished within the scope of the disclosure and claims herein.

Figure 6:
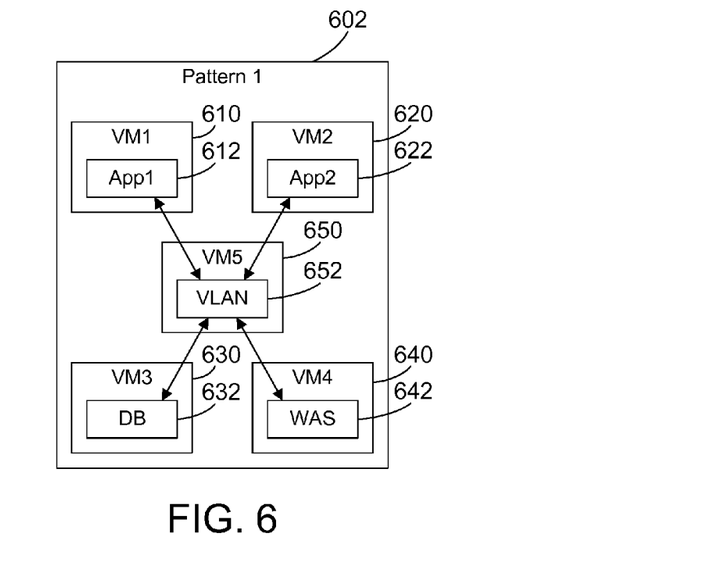
FIG. 6 is a block diagram showing one specific example for a VM pattern.
Figure 7:
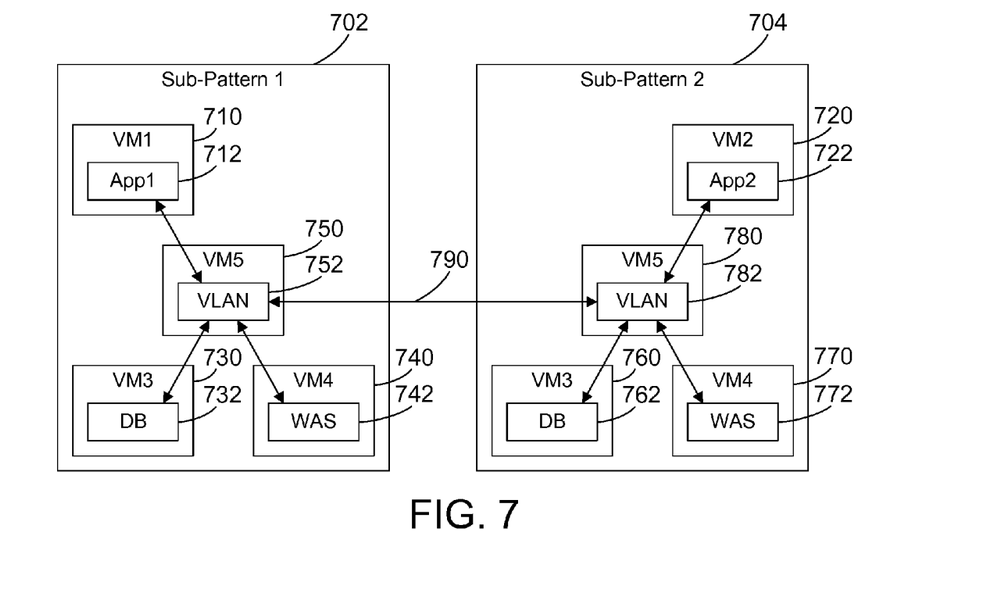
FIG. 7 is a block diagram showing how the VM pattern in FIG. 6 could be split into two VM sub-patterns.

A simple example is presented in FIGS. 6 and 7 to illustrate splitting a VM pattern into multiple VM sub-patterns, as shown in method 500 in FIG. 5. Referring to FIG. 6, a VM pattern 602 includes the definition of five virtual machines 610, 620, 630, 640 and 650. VM1 610 includes a customer application 612. VM2 620 includes a different customer application 622. VM3 630 includes a suitable database 632, such as a DB2 database. VM4 640 includes a Websphere Application Server (WAS) 642. VM5 650 includes a VLAN 652 that allows the components in the other VMs to communicate with each other. Note that while VLAN 652 is shown in FIG. 6 in a separate VM, the VLAN 652 could be implemented instead within one of the four other VMs, which would eliminate the need for a separate VM 650 to host the VLAN 652, or could be implemented outside the VMs. We assume for this example the two customer applications 612 and 622 need access to a database 632 and a WAS 642.

The pattern reconfiguration estimator 420 determines a potential split of the VM pattern 602 into two potential sub-patterns 702 and 704 shown in FIG. 7. Note that each sub-pattern includes only one of the customer applications, but includes the other components needed to support the customer application. Thus, sub-pattern 702 includes a first VM 710 with the first customer application 712, a VM 730 running the database 732, a VM 740 running the WAS 742, and a VM 750 running the VLAN 752. Sub-pattern 704 includes a first VM 720 with the second customer application 722, a VM 760 running a database 762, a VM 770 running the WAS 772, and a VM 780 running the VLAN 782. Note the VLAN 752 and VLAN 782 communicate via an optional link 790 between the two.

The example in FIGS. 6 and 7 is extremely simplified to illustrate the general concepts of splitting a VM pattern into multiple sub-patterns. These concepts extend to an implementation with hundreds or thousands of VMs, and extend to splitting a single VM pattern or sub-pattern into many different VM sub-patterns. Of course, splitting is only one specific way to reconfigure VM patterns. Multiple VM patterns could be coalesced into one VM pattern, and configuration of one or more VM patterns could be performed without splitting or coalescing. The disclosure and claims herein expressly extend to all types of VM pattern reconfiguration, whether currently known or developed in the future.

Figure 8:
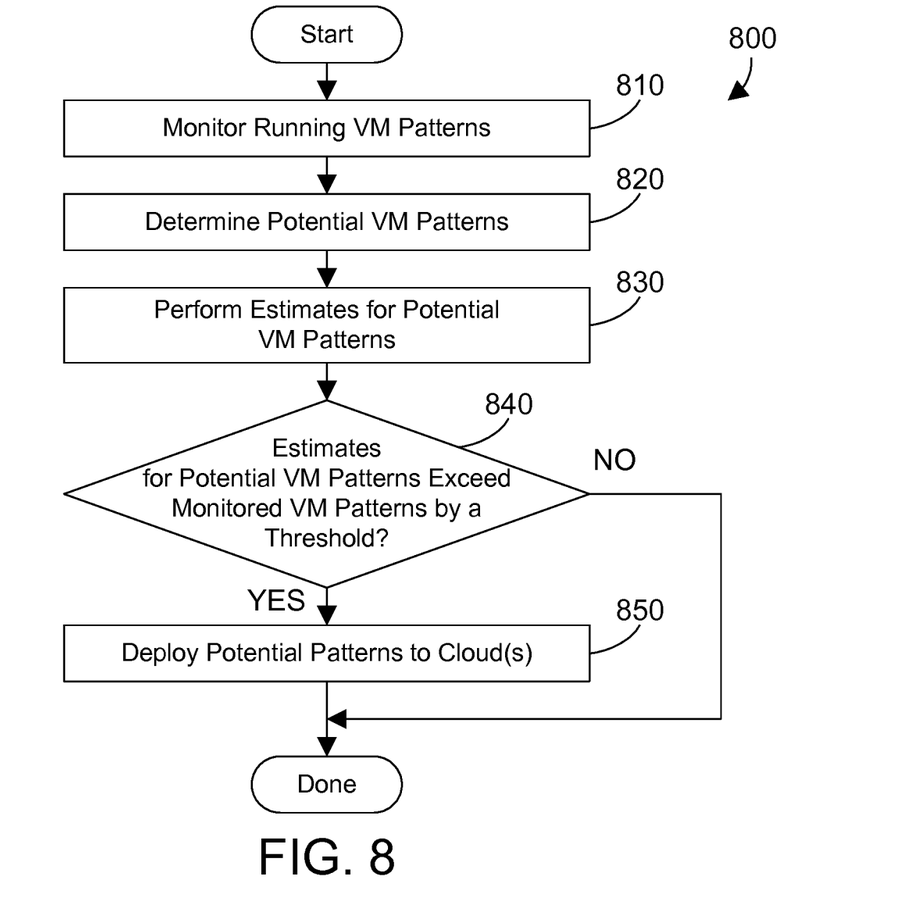
FIG. 8 is a flow diagram of a method for monitoring running VM patterns and dynamically reconfiguring the VM patterns according to dynamically changing conditions.

Referring to FIG. 8, a method 800 shows steps preferably performed by the VM pattern manager 410 in FIG. 4. The running VM patterns are monitored (step 810). Monitoring the running VM patterns involves collecting information relating to multiple metrics that are used to monitor the VM patterns. The types of metrics that could be used are discussed in more detail below. Potential VM patterns are determined (step 820).

The potential VM patterns determined in step 820 can include a slightly modified split of two sub-patterns, such as changing allocation of resources between the two sub-patterns. The potential VM patterns determined in step 820 can also include a more modified split, such as splitting a VM pattern that was formerly split into two sub-patterns into three sub-patterns. The potential VM patterns determined in step 820 can also include a highly modified split, such as splitting three different sub-patterns into two sub-patterns each, resulting in six sub-patterns instead of three. The potential VM patterns determined in step 820 could also include potential VM patterns that are reconfigured without being split. The disclosure and claims herein expressly extend to all suitable potential VM patterns. Once the potential VM patterns are determined in step 820, estimates for those potential VM patterns are performed (step 830). The estimates in step 830 are most preferably in terms of one or more metrics that correspond to the metrics monitored in step 810 so the metrics for the potential VM patterns may be compared with the corresponding metrics for the running VM patterns. When the estimates for the potential VM patterns exceed the monitored VM patterns by some defined threshold (step 840=YES), the potential VM patterns are deployed to one or more clouds (step 850). When the estimates for the potential VM patterns do not exceed the monitored VM patterns by some defined threshold (step 840=NO), method 800 is done.

Figure 9:
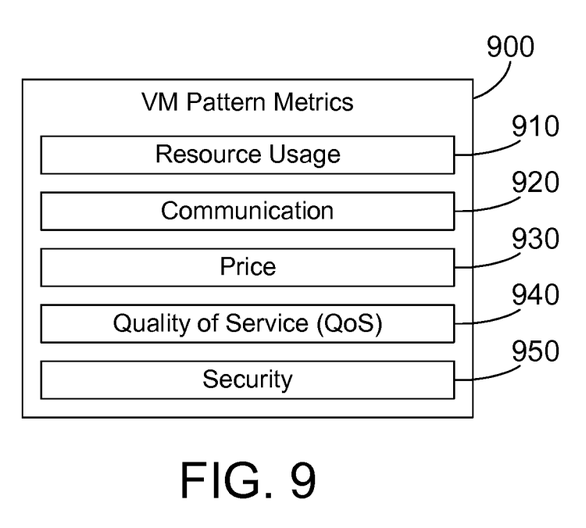
FIG. 9 is a block diagram showing suitable examples of categories of VM pattern metrics.

FIG. 9 shows some suitable examples of categories of pattern metrics 900 that could be used for the running VM patterns and for the potential VM patterns. Pattern metrics 900 include resource usage 910, communication 920, price 930, Quality of Service (QoS) 940, and security 950. Metrics relating to resource usage 910 may include processor usage, memory usage, disk usage, and network usage. Metrics relating to communications 920 may include available network bandwidth, network bandwidth used, number of hops between source and destination, number or size of messages between a source and a destination or in aggregate, and a peak load communication guarantee. Metrics relating to price 930 may include pricing for different clouds at different times, how those prices change depending on time of day, season, number of VMs, etc., and pricing for licenses of various resources including operating systems, databases, applications, etc. Metrics relating to QoS 940 may include user response time, error rates, network congestion, and high availability. Metrics relating to security 950 may include user security requirements, data security requirements that determine where data is stored, encryption/decryption of data, etc. Other types of metrics not shown in FIG. 9 could also be used, and are within the scope of the disclosure and claims herein. For example, a metric could include number of users for a VM or a sub-pattern, a number of users per cloud, a number of VMs per cloud, a number of users or VMs per tenant (organization), etc. Data metrics may also be used, which could specify location of where certain data must be stored, whether or not data must be encrypted, that data generated in geographical location A must be moved to a specified sub-pattern or region, etc.

A simple example is now presented to illustrate the concepts presented above. Let's assume for this example the pattern 602 shown in FIG. 6 has been deployed and is running Let's further assume the pattern 602 has 500 gigabytes (GB) of disk space available. We assume a threshold is set at 400 GB of disk usage so opportunities to split the VM pattern can be investigated when the disk usage exceeds the threshold of 400 GB. Let's assume that initially, the VMs in pattern 602 use 200 GB of disk total. When the monitor determines compares the disk usage of 200 GB to the 400 GB threshold, the monitor determines no action is needed. Let's now assume that over time, the disk usage increases until it exceeds 400 GB. Once the usage exceeds the 400 GB threshold, the VM pattern mechanism will determine whether the pattern 602 can be split. For this example, we assume that VMs 610, 620, 630 and 640 each use 105 GB of disk, resulting in a total of 420 GB, which exceeds the 400 GB threshold. To simplify this example, we assume the usage of disk for VM 650 in hosting VLAN 652 is negligible. In response to exceeding the 400 GB threshold, the VM pattern manager can determine possible splits of the VM pattern 602, such as into two potential sub-patterns 702 and 704 shown in FIG. 7. Estimates are then performed for the potential sub-patterns 702 and 704 based on the metric of interest, namely disk usage. We assume for this simple example VM1 710 uses 105 GB of disk space and VM3 730 and VM 4 740 use 60 GB each of disk space, resulting in 225 GB total, which is below the 400 GB threshold. We further assume VM 720 uses 105 GB of disk space and VM3 760 and VM4 770 use 60 GB each of disk space, resulting in 225 GB total, which is below the 400 GB threshold. The VM pattern manager can then determine that the potential sub-patterns 702 and 704 shown in FIG. 7 result in disk usage less than the threshold, and can dynamically deploy the two sub-patterns 702 and 704 to replace the VM pattern 602.

Of course, the example in the preceding paragraph is extremely simplified for the purpose of illustration, but one of ordinary skill in the art will appreciate from the example the many variations that are included within the scope of the disclosure and claims herein.

For example, a pattern or VMs within a pattern can have any suitable number or type of thresholds, including thresholds that are a composite of multiple metrics. For example, a threshold could be defined that defines maximum values for multiple metrics, such as processor utilization, memory utilization or disk utilization, such that exceeding any of the multiple metrics will result in the VM pattern manager considering potential reconfiguration. This threshold would represent a logical "OR" function between the metrics, where if any of the specified values for metrics is exceeded, the VM pattern manager will take action. A different kind of threshold could represent a logical "AND" function, where multiple conditions must be met for the VM pattern manager to take action. For example, a threshold could be defined for 90% processor utilization in any particular VM in conjunction with (AND function) 75% processor utilization in all VMs in a pattern that contains the VM. Yet a third kind of threshold could include any suitable function or heuristic based on any suitable metric for a VM or for a VM pattern. In addition, a threshold or values within a threshold could be dynamically determined based on changing conditions. The disclosure and claims herein expressly extend to any and all types of thresholds that could be defined in terms or one or more metrics for a VM, for a VM pattern, a VM sub-pattern, a network, an application, a service, etc.

One of the significant features of the VM pattern manager disclosed herein is the ability to dynamically shop for clouds based on price. The pattern estimation mechanism 430 may query different clouds to determine price based on the characteristics of the pattern. The VM pattern manager may then make selections of where to deploy patterns in order to minimize the cost, given the other specified requirements in the patterns are satisfied.

The disclosure and claims herein relate to a cloud manager that monitors running VM patterns, determines potential VM patterns that have a different configuration than the running VM patterns, and performs estimates of a plurality of metrics for the potential VM patterns. When the estimates for the potential VM patterns exceed the monitored VM patterns currently running by some threshold amount, the potential VM patterns may be automatically deployed to one or more clouds. The result is a cloud-based system that is automatically and dynamically tuned to changing conditions.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for managing a networked computer system, the method comprising:
    running a plurality of virtual machine (VM) patterns in the networked computer system, where each of the plurality of VM patterns comprises a plurality of virtual objects that are managed as a single object, the plurality of virtual objects including a plurality of virtual machines;
    monitoring a plurality of metrics for the plurality of VM patterns;
    determining a plurality of potential VM patterns that are not running in the networked computer system and that have different configurations than the plurality of VM patterns running in the networked computer system;
    estimating at least one of the plurality of metrics on the plurality of potential VM patterns;

determining when the estimated metrics on the plurality of potential VM patterns exceed a threshold value for at least one of the plurality of metrics for the plurality of VM patterns; and when the estimated metrics on the plurality of potential VM patterns exceed the threshold value, deploying the plurality of potential VM patterns to run on the networked computer system.

2. The method of claim 1 further comprising removing the plurality of VM patterns when the plurality of potential VM patterns is deployed to the at least one cloud.

3. The method of claim 1 wherein the threshold value comprises a composite of a plurality of values for the plurality of metrics.

4. The method of claim 1 wherein the plurality of metrics comprises metrics for resource usage.

5. The method of claim 1 wherein the plurality of metrics comprises metrics for communications.

6. The method of claim 1 wherein the plurality of metrics comprises metrics for price.

7. The method of claim 1 wherein the plurality of metrics comprises metrics for quality of service.

8. The method of claim 1 wherein the plurality of metrics comprises metrics for security.

9. A computer-implemented method executed by at least one processor for managing a networked computer system, the method comprising:

running a plurality of virtual machine (VM) patterns in the networked computer system, where each of the plurality of VM patterns comprises a plurality of virtual objects that are managed as a single object, the plurality of virtual objects including a plurality of virtual machines;

monitoring a plurality of metrics for the plurality of VM patterns, wherein the plurality of metrics comprises:

metrics for resource usage;
metrics for communications;
metrics for price;
metrics for quality of service; and
metrics for security;

determining a plurality of potential VM patterns that are not running in the networked computer system that have different configurations than the plurality of VM patterns running in the networked computer system;

estimating the plurality of metrics on the plurality of potential VM patterns;

determining when the estimated metrics on the plurality of potential VM patterns exceed a threshold value that comprises a composite of a plurality of values for the plurality of metrics; and when the estimated metrics on the plurality of potential VM patterns exceed the threshold value, replacing the plurality of VM patterns on the networked computer system with the plurality of potential VM patterns.

10. The method of claim 9 wherein the metrics for resource usage comprise processor resource usage, memory usage, disk usage and network bandwidth usage.

11. The method of claim 9 wherein the metrics for price comprise price and potential price differences for a plurality of clouds, price differences for different times of the day, and price differences for licenses.

12. The method of claim 9 wherein the metrics for security comprise location of data and whether or not data is encrypted.

* * * * *